US012198651B2

(12) United States Patent
Wei et al.

(10) Patent No.: US 12,198,651 B2
(45) Date of Patent: Jan. 14, 2025

(54) PIXEL CIRCUIT AND MANUFACTURING METHOD THEREOF

(71) Applicant: TCL China Star Optoelectronics Technology Co., Ltd., Guangdong (CN)

(72) Inventors: Hongquan Wei, Shenzhen (CN); Yichen Bai, Shenzhen (CN); Yanxi Ye, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/621,829

(22) PCT Filed: Nov. 15, 2021

(86) PCT No.: PCT/CN2021/130691

§ 371 (c)(1),
(2) Date: Dec. 22, 2021

(87) PCT Pub. No.: WO2023/070758

PCT Pub. Date: May 4, 2023

(65) Prior Publication Data

US 2024/0265886 A1 Aug. 8, 2024

(30) Foreign Application Priority Data

Oct. 25, 2021 (CN) ......................... 202111241320.2

(51) Int. Cl.
*G09G 3/36* (2006.01)

(52) U.S. Cl.
CPC ... *G09G 3/3648* (2013.01); *G09G 2300/0426* (2013.01); *G09G 2320/0223* (2013.01)

(58) Field of Classification Search
CPC ......... G09G 3/3648; G09G 2300/0426; G09G 2320/0223; G02F 1/136286; G02F 1/1368
See application file for complete search history.

(56) References Cited

U.S. PATENT DOCUMENTS

2013/0057459 A1 3/2013 Kuo et al.
2014/0375534 A1 12/2014 Lee et al.
(Continued)

FOREIGN PATENT DOCUMENTS

CN 201886234 U 6/2011
CN 105932029 A 9/2016
(Continued)

OTHER PUBLICATIONS

Chinese Office Action issued in corresponding Chinese Patent Application No. 202111241320.2 dated May 31, 2022, pp. 1-8.
(Continued)

*Primary Examiner* — Abhishek Sarma
(74) *Attorney, Agent, or Firm* — Nathan & Associates; Menachem Nathan

(57) ABSTRACT

A pixel circuit of the present invention includes a thin-film transistor, a first scan line, a second scan line, and a data line. The first scan line is arranged along a first direction. The first scan line is electrically connected to the thin-film transistor. The second scan line is arranged along a second direction. The second scan line is electrically connected to the first scan line. The second direction is perpendicular to the first direction. The data line is arranged along the second direction. The data line is electrically connected to the thin-film transistor. The pixel circuit also includes an auxiliary scan line. The auxiliary scan line is arranged along the second direction. Two ends of the auxiliary scan line are electrically connected to the second scan line.

16 Claims, 7 Drawing Sheets

(56) References Cited

U.S. PATENT DOCUMENTS

| | | | | |
|---|---|---|---|---|
| 2020/0174329 | A1 | 6/2020 | Baba et al. | |
| 2023/0097478 | A1 * | 3/2023 | Xiao | G02F 1/136222 349/33 |

FOREIGN PATENT DOCUMENTS

| | | | |
|---|---|---|---|
| CN | 109521613 | A | 3/2019 |
| CN | 112068368 | A | 12/2020 |
| CN | 112764284 | A | 5/2021 |
| JP | H04280226 | A | 10/1992 |
| JP | 2007298943 | A | 11/2007 |
| JP | 2009199029 | A | 9/2009 |
| JP | 2010039444 | A | 2/2010 |

OTHER PUBLICATIONS

Chinese Office Action issued in corresponding Chinese Patent Application No. 202111241320.2 dated Oct. 10, 2022, pp. 1-6.
International Search Report in International application No. PCT/CN2021/130691, mailed on Jun. 24, 2022.
Written Opinion of the International Search Authority in International application No. PCT/CN2021/130691, mailed on Jun. 24, 2022.
Chinese Decision of Rejection issued in corresponding Chinese Patent Application No. 202111241320.2 dated Jan. 10, 2023, pp. 1-4.
Japanese Office Action issued in corresponding Japanese Patent Application No. 特願2021-569193 dated Feb. 13, 2024, pp. 1-7.

* cited by examiner

PIXEL CIRCUIT AND MANUFACTURING METHOD THEREOF

FIELD OF INVENTION

The present invention is related to the field of display technology and specifically to a pixel circuit and a manufacturing method thereof.

BACKGROUND OF INVENTION

Since liquid crystal display (LCD) panels have advantages of saving energy, lightness and thinness, exquisite display, etc., they have been widely used in the field of display technology. Generally, a structure of a liquid crystal display panel includes an upper substrate, a lower substrate, and a liquid crystal layer disposed between the upper substrate and the lower substrate. A color filter is provided on the upper substrate, and a thin-film transistor (TFT) array layer is provided on the lower substrate. The upper substrate and the lower substrate are manufactured separately, the liquid crystal layer is then sealed on a periphery of the upper substrate and the lower substrate through aligning and combining and applying frame glue, and a liquid crystal cell required for the liquid crystal display panel is formed subsequently.

However, a width of a frame of the liquid crystal display panel is affected by a packaging technology of the liquid crystal cell, a wiring design of a pixel circuit of the liquid crystal display panel, or manufacturing process requirements of the liquid crystal display panel. When the width of the frame of the liquid crystal display panel is larger, an actual display area of the liquid crystal display panel is smaller.

In recent years, with continuous development in the display technology field, requirements for the liquid crystal display panel of people have become more and more stringent. A screen ratio of the liquid crystal display panel, i.e., a ratio of a display area of the liquid crystal display panel screen to the liquid crystal display panel, must be higher and higher. For example, for narrow-frame TVs and full-screen mobile phones, in order to increase the screen ratio and increase the display area, the frame of the liquid crystal display panel must be reduced and narrowed as much as possible, so that the liquid crystal display panel can achieve a shape that is more concise, detailed, and beautiful.

The pixel circuit of the conventional liquid crystal display panel is driven by a data line and a scan line that are perpendicularly interlaced. A bonding space for chip-on-film (COF) needs to be reserved on a side of the data line. Although the bonding space required by the chip-on-film can be removed by gate-on-array (GOA) on a side of the scan line, since a circuit of the gate-on-array is too complicated, a certain amount of space still needs to be reserved on the side of the scan line. Since neither the side of the scan line nor the side of the scan line can have a space further reduced, the frame of the liquid crystal display panel still has a certain width, so that the screen ratio cannot be increased.

SUMMARY OF INVENTION

The present invention provides a pixel panel of a liquid crystal display panel and a manufacturing method thereof which can reduce a frame width on a side of a scan line to which the pixel panel of the liquid crystal display panel correspond, so as to increase a screen ratio of the liquid crystal display panel.

The present invention provides a display panel including a thin-film transistor, a first scan line, a second scan line, and a data line. The first scan line is arranged along a first direction. The first scan line is electrically connected to the thin-film transistor. The second scan line is arranged along a second direction. The second scan line is electrically connected to the first scan line. The second direction is perpendicular to the first direction. The data line is arranged along the second direction. The data line is electrically connected to the thin-film transistor.

In an embodiment of the present invention, the pixel circuit further includes an auxiliary scan line arranged along the second direction. Two ends of the auxiliary scan line are electrically connected to the second scan line.

In an embodiment of the present invention, the auxiliary scan line and the second scan line are arranged in different layers.

In an embodiment of the present invention, the auxiliary scan line and the first scan line are arranged in a first wiring layer. The data line and the first scan line are insulated from each other in the first wiring layer.

In an embodiment of the present invention, the auxiliary scan line and the second scan line are arranged in a second wiring layer. The data line and the second scan line are insulated from each other in the second wiring layer.

In an embodiment of the present invention, a thickness of the auxiliary scan line ranges from 2500 angstroms to 8000 angstroms.

In an embodiment of the present invention, the thickness of the auxiliary scan line is 7000 angstroms.

In an embodiment of the present invention, the pixel circuit further includes a pixel electrode. The pixel electrode is arranged between the data line and the second scan line along with the auxiliary scan line. The pixel electrode is electrically connected to the thin-film transistor.

In an embodiment of the present invention, the pixel circuit further includes a scan input end and a data input end. The scan input end is electrically connected to an end of the second scan line away from the first scan line, and inputting a scanning signal to the thin-film transistor through the first scan line, the second scan line, and the auxiliary scan line. The data input end is electrically connected to an end of the data line away from the thin-film transistor, and inputting a data signal to the thin-film transistor through the data line.

In an embodiment of the present invention, the scan input end and the data input end are arranged along a positive direction or a negative direction of the second direction.

The present invention further provides a manufacturing method of a display panel, including:

- forming a first scan line and a gate along a first direction, wherein the gate is electrically connected to the first scan line;
- forming a gate insulating layer on the gate;
- forming an active layer on the gate insulating layer;
- forming a source and a drain on the active layer, wherein the source and the drain is electrically connected to the active layer;
- forming a second scan line along a second direction, wherein the second direction is perpendicular to the first direction, and the second scan line is electrically connected to the first scan line; and
- forming a data line along the second direction, wherein the data line is electrically connected to the source.

In an embodiment of the present invention, the manufacturing method further includes:

forming an auxiliary scan line along the second direction, wherein two ends of the auxiliary scan line are electrically connected to the second scan line.

In an embodiment of the present invention, the auxiliary scan line and the second scan line are formed in different layers.

In an embodiment of the present invention, the auxiliary scan line and the first scan line are formed by a first wiring layer. The data line and the first scan line are insulated from each other in the first wiring layer.

In an embodiment of the present invention, the auxiliary scan line and the second scan line are formed by a second wiring layer. The data line and the second scan line are insulated from each other in the second wiring layer.

In an embodiment of the present invention, a thickness of the auxiliary scan line ranges from 2500 angstroms to 8000 angstroms.

In an embodiment of the present invention, the thickness of the auxiliary scan line is 7000 angstroms.

In an embodiment of the present invention, the manufacturing method further includes:

forming a pixel electrode between the data line and the second scan line along with the auxiliary scan line, wherein the pixel electrode is electrically connected to the thin-film transistor.

In an embodiment of the present invention, the manufacturing method further includes:

- forming a scan input end on an end of the second scan line away from the first scan line, wherein the scan input end inputs a scanning signal to the thin-film transistor through the first scan line, the second scan line, and the auxiliary scan line; and
- forming a data input end on an end of the data line away from the thin-film transistor, wherein the data input end inputs a data signal to the thin-film transistor through the data line.

In an embodiment of the present invention, the scan input end and the data input end are formed along a positive direction or a negative direction of the second direction.

In the prior art, the data line and the scan line that are perpendicularly interlaced and input that drive the liquid crystal display panel cause two adjacent sides of the liquid crystal display panel to have a wider frame. The pixel circuit and the manufacturing method thereof of the present invention arrange a scanning signal input end and a data signal input end of the thin-film transistor on a same side of the liquid crystal display panel through a design of the first scan line arranged along the first direction and the second scan line arranged along the second direction. Therefore, the liquid crystal display panel applying the present invention can effectively reduce a wiring space of the liquid crystal display panel, and reduce a space of the frame of the liquid crystal display panel of the prior art, so that a screen ratio of the liquid crystal display panel applying the pixel circuit of the present invention is higher than a screen ratio of the liquid crystal display panel in the prior art. In addition, the pixel circuit and the manufacturing method thereof of the present invention further arrange the auxiliary scan line in parallel with the second scan line, so that resistances of the first scan line and the second scan line are reduced, and a parasitic capacitance between the first scan line along with the second scan line and other wires or the pixel electrode is reduced, thereby maintaining an expected performance of the liquid crystal display panel.

DETAILED DESCRIPTION OF EMBODIMENTS

In order to make the above purposes, features, and advantages of the present invention more obvious and understandable, the following is a detailed description of preferred embodiments of the present invention in conjunction with accompanying drawings.

Figure 1:
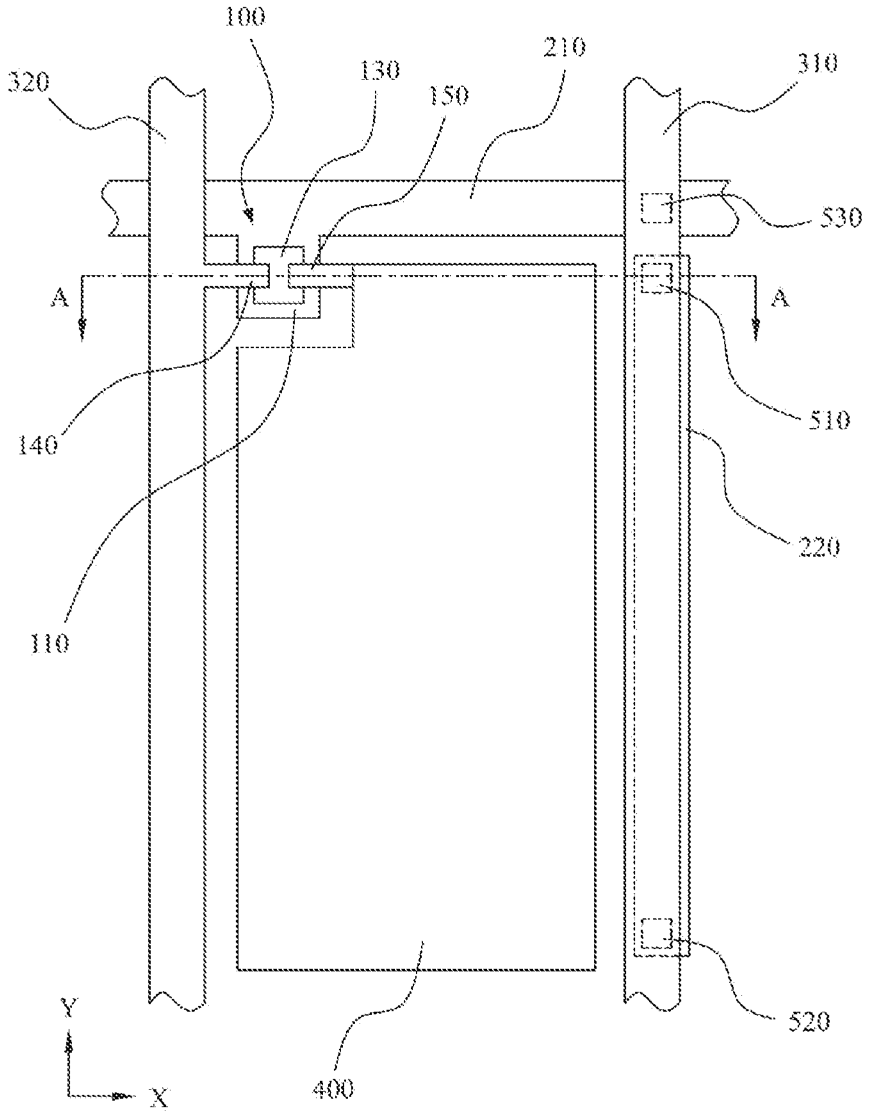
FIG. 1 is a structural diagram of a pixel circuit of the present invention.

The present invention provides a pixel circuit of a liquid crystal display panel. Referring to FIG. 1, which is a structural diagram of the pixel circuit of the present invention. The pixel circuit of the present invention includes a thin-film transistor 100, a first scan line 210, a second scan line 310, and a data line 320.

In the present invention, the pixel circuit shown in FIG. 1 corresponds to one pixel of the liquid crystal display panel. Therefore, when the liquid crystal display panel applies the pixel circuit of the present invention, a plurality of pixel circuits of a same number as a plurality of pixels can be arranged according to actual requirements.

The thin-film transistor 100 basically includes a source 140, a drain 150, and a gate 110. The source 140 is configured to receive a data signal of the liquid crystal display panel. The gate 110 is configured to receive a scanning signal of the liquid crystal display panel, and control connecting and disconnecting between the source 140 and the drain 150 through the scanning signal, so as to achieve an image display of the pixel of the liquid crystal display panel.

As shown in FIG. 1, the first scan line 210 is arranged along a first direction X, and the first scan line 210 is electrically connected to the gate 110 of the thin-film transistor 100. The second scan line 310 is arranged along the second direction Y, and the second scan line 310 is electrically connected to the first scan line 210 through a third through hole 530. The data line 320 is arranged along a second direction Y, and the data line 320 is electrically connected to the thin-film transistor 100. In this embodiment, the second direction Y is perpendicular to the first direction X.

As shown in FIG. 1, the pixel circuit further includes a pixel electrode 400. The pixel electrode 400 is arranged between the data line 320 and the second scan line 310 along with an auxiliary scan line 220. The pixel electrode 400 is electrically connected to the drain 150 of the thin-film transistor 100. When the scanning signal of the liquid crystal display panel is inputted to the gate 110 of the thin-film transistor 100 through the second scan line 310 and the first scan line 210, the thin-film transistor 100 is turned on, so that the data signal of the liquid crystal display panel can be inputted to the pixel electrode 400 through the data line 320, the source 140, and the drain 150.

In this embodiment, the data line 320 and the second scan line 310 have a certain distance defined in between. In this way, in addition to effectively performing a circuit wiring configuration of the pixel to maintain an opening ratio of the pixel, the data line 320 and the second scan line 310 can also be prevented from generating a parasitic capacitance, thereby maintaining an operational efficiency that the pixel circuit deserves.

In an embodiment, as shown in FIG. 1, the pixel circuit further includes the auxiliary scan line 220. The auxiliary scan line 220 is arranged along the second direction Y. Two ends of the auxiliary scan line 220 are electrically connected to the second scan line 310 through a first through hole 510 and a second through hole 520, respectively.

When the scanning signal of the liquid crystal display panel is being transmitted, it needs to be transmitted by the second scan line 310 and the first scan line 210 to be inputted into the gate 110 of the thin-film transistor 100. Therefore, a wiring path of the scanning signal in the pixel circuit of the present invention is longer than a wiring path of the scanning signal in the pixel circuit of the prior art. Since a longer wiring path of the scanning signal is accompanied by an increased in a wiring resistance, thereby causing a delay of the scanning signal or an insufficient charging of the thin-film transistor 100, which ultimately degrades a display effect of the liquid crystal display panel.

The pixel circuit of the present invention, considering the above-mentioned problems, is provided with the auxiliary scan line 220 connected in parallel with the second scan line 310, so as to increase an equivalent cross-sectional area of the wiring path of the scanning signal, and thereby reducing the wiring resistance. Between the first through hole 510 and the second through hole 520, the equivalent cross-sectional area of the wiring path of the scanning signal is greatly increased, so that the wiring resistance is reduced, the scanning signal is not delayed, and a required charging capacity of the thin-film transistor 100 is maintained, thereby ultimately maintaining the display effect of the liquid crystal display panel.

Figure 2:
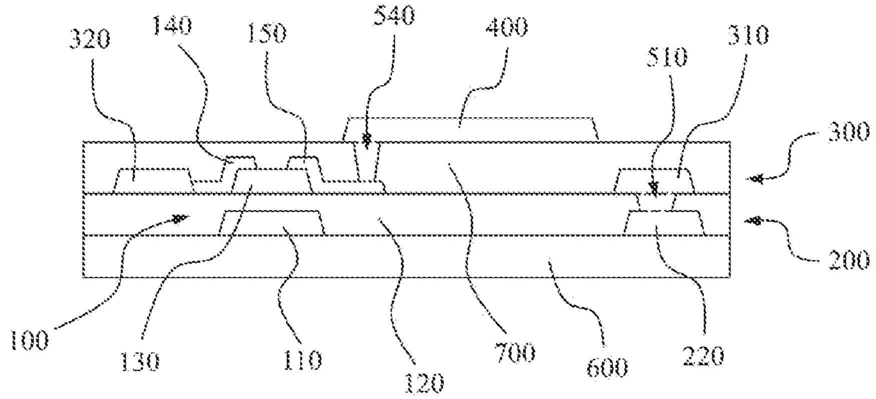
FIG. 2 is a partial cross-sectional diagram of a liquid crystal display panel applying the pixel circuit of the present invention taken along line A-A of FIG. 1.

Referring to FIG. 2, which is a partial cross-sectional diagram of the liquid crystal display panel applying the pixel circuit of the present invention taken along line A-A of FIG. 1. The present invention exemplarily illustrates relative relationships among various elements in the pixel circuit through the partial cross-sectional diagram of the liquid crystal display panel.

The pixel circuit of the present invention is arranged on a substrate 600 of the liquid crystal display panel. The first wiring layer 200 of the pixel circuit is provided on the substrate 600. The first wiring layer 200 includes the gate 110 of the thin-film transistor 100, the first scan line 210 (not shown), and the auxiliary scan line 220. The gate 110, the first scan line 210, and the auxiliary scan line 220 are made of copper (Cu) or copper-molybdenum (CuMo) alloy in a same manufacturing process. Thicknesses of the gate 110, the first scan line 210, and the auxiliary scan line 220 range from 2500 angstroms (Å) to 8000 angstroms, and preferably 7000 angstroms.

It should be noted that, in the first wiring layer 200, the auxiliary scan line 220 and the first scan line 210 are insulated from each other. That is, the auxiliary scan line 220 and the first scan line 210 are not connected to each other on a same horizontal plane.

As shown in FIG. 2, the first wiring layer 200 is covered with a gate insulating layer 120. A purpose of providing the gate insulating layer 120 is not only for isolating the active layer 130, the source 140, and the drain 150 in a subsequent stack of the thin-film transistor 100, but also for a purpose of planarizing a region of the auxiliary scan line 220.

As shown in FIG. 2, the gate insulating layer 120 corresponds to a region above the auxiliary scan line 220 is defined with the first through hole 510. The first through hole 510 is configured to electrically connect the auxiliary scan line 220 and the second scan line 310 provided thereon. The active layer 130 is provided in a region of the gate insulating layer 120 corresponding to the gate 110. The source 140 and the drain 150 are provided on two sides of the active layer 130. The active layer 130 is made of indium gallium zinc oxide (IGZO) or amorphous silicon (a-Si) material.

A second wiring layer 300 of the pixel circuit is further provided on the gate insulating layer 120. The second wiring layer 300 includes the data line 320 and the second scan line 310. The source 140 is electrically connected to the data line 320. The data line 320 and the second scan line 310 are made of copper (Cu) or copper-molybdenum (CuMo) alloy in the same manufacturing process. Thicknesses of the data line 320 and the second scan line 310 range from 2500 angstroms (Å) to 8000 angstroms, and preferably 7000 angstroms.

It should be noted that, in the second wiring layer 300, the data line 320 and the second scan line 310 are insulated from each other. That is, the data line 320 and the second scan line 310 are not connected to each other on a same horizontal plane.

As shown in FIG. 2, the second wiring layer 300 is covered with a passivation layer 700. A purpose of providing the passivation layer 700 is not only isolating the thin-film transistor 100, the data line 320, and the second scan line 310, but also for a purpose of planarizing and forming a substrate for the pixel electrode 400 of a subsequent stack.

The passivation layer 700 defines a fourth through hole 540 corresponding to a region on the drain 150 of the thin-film transistor 100. The fourth through hole 540 is configured to electrically connect the drain 150 and the pixel electrode 400 provided thereon.

The partial cross-sectional diagram of the liquid crystal display panel shown in FIG. 2 only exemplarily shows a part of a structure of the liquid crystal display panel applying the pixel circuit of the present invention. FIG. 2 is not intended to limit the pixel circuit of the present invention. In addition, other necessary components of the liquid crystal display panel to achieve a display screen are not shown in FIG. 2, people having ordinary skill in the display technology field should be able to understand an arrangement of the other necessary components described in the liquid crystal display panel of the above-mentioned embodiment through the conventional technology in this field.

Figure 3:
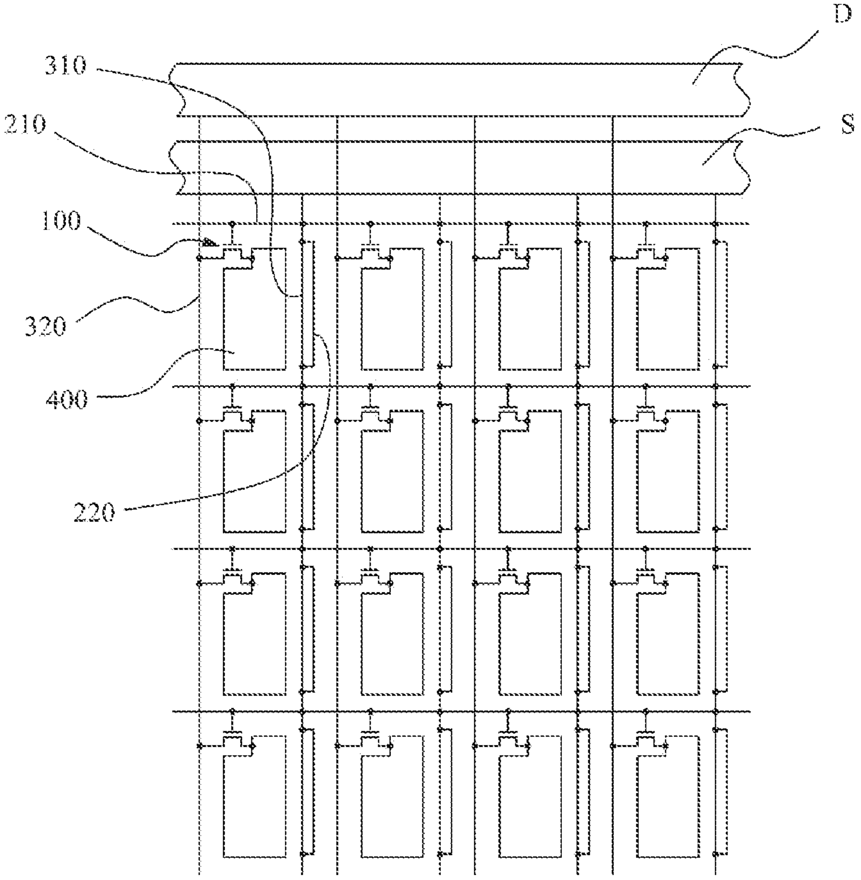
FIG. 3 is a partial circuit diagram of the liquid crystal display panel applying the pixel circuit of the present invention.

Referring to FIG. 3, which is a partial circuit diagram of the liquid crystal display panel applying the pixel circuit of the present invention. With reference to the pixel circuit of FIG. 1, the partial circuit diagram of the liquid crystal display panel shown in FIG. 3 includes the pixel circuits of 4 rows and 4 columns. In other words, FIG. 3 shows 16 of the pixels controlled by 16 of the pixel electrodes 400. As shown in FIGS. 1 and 3, the first direction X is a horizontal direction of the liquid crystal display panel, and the second direction Y is a vertical direction of the liquid crystal display panel.

Since the first scan line 210 electrically connected to the thin-film transistor 100 is arranged along the first direction X, and the first scan line 210 is further electrically connected to the second scan line 310 arranged along the second direction Y. Therefore, a scan input end S of the scanning signal of the liquid crystal display panel can be configured in a positive direction or a negative direction of the second direction Y. In this embodiment, the scan input end S of the scanning signal can be arranged on an upper side of the liquid crystal display panel.

In addition, since the data line 320 electrically connected to the pixel circuit of the thin-film transistor 100 is arranged along the second direction Y, the data input end D of the data signal of the liquid crystal display panel can be arranged at the positive direction or the negative direction of the second direction Y. In this embodiment, the data input end D of the data signal can be arranged on the upper side of the liquid crystal display panel. That is, the scan input end S of the scanning signal and the data input end D of the data signal is arranged on a same side.

As shown in FIG. 3, although the wiring path from the scan input end S of the scanning signal to the thin-film transistor 100 of each of the pixel circuits is longer than the wiring path of that in the prior art, in the present invention, the second scan line 310 is connected in parallel with the auxiliary scan line 220 to increase the equivalent cross-sectional area of the wiring path of the scanning signal, thereby reducing the wiring resistance.

It can be seen from the example of FIG. 3 that facilitated from a structural design of the pixel circuit of the present invention, the scan input end S of the scanning signal of the liquid crystal display panel and the data input end D of the data signal can be arranged on the same side of the liquid crystal display panel. Therefore, three sides of the frame of the liquid crystal display panel do not need to be configured to be any input ends to be provided with driver chips or configured to be binding ends, etc., thereby effectively saving the wiring space of the liquid crystal display panel, and reducing a space of the frame, such that the screen ratio of the liquid crystal display panel can be increased.

The present invention also provides a manufacturing method of a pixel circuit of a liquid crystal display panel. Referring to FIGS. 4-8, which are structural diagrams showing the pixel circuit of the present invention at different manufacturing processes.

The pixel circuit manufactured in the present invention as shown in FIGS. 4-8 corresponds to one pixel of the liquid crystal display panel. Therefore, when the liquid crystal display panel applies the pixel circuit of the present invention, a plurality of pixel circuits of a same number as a plurality of pixels can be arranged according to actual requirements. In this embodiment, FIGS. 4-8 exemplarily show the pixel circuits in 2 rows and 2 columns, i.e., structure diagrams of 4-pixel circuits arranged in an array in each of the manufacturing process.

The manufacturing method of the pixel circuit will be described below with reference to FIG. 2 of the foregoing embodiment. The present invention exemplarily illustrates relative relationships among various elements in the pixel circuit in each of the manufacturing processes through the partial cross-sectional diagram of the liquid crystal display panel shown in FIG. 2.

Figure 4:
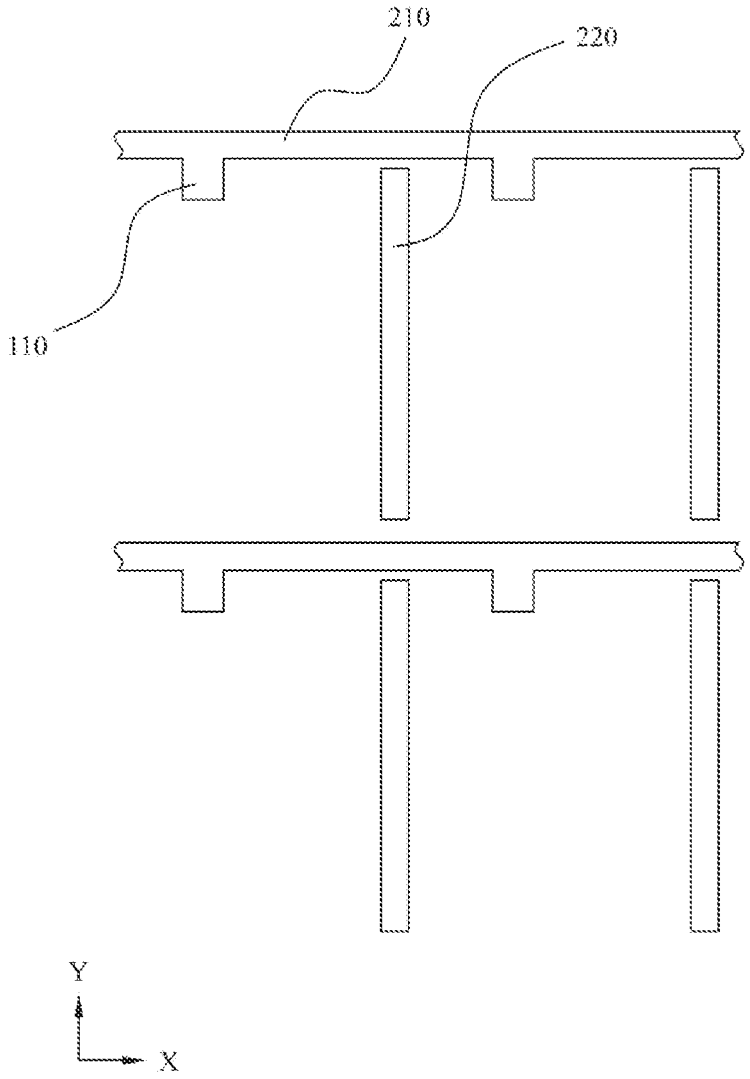
FIGS. 4-8 are structural diagrams showing the pixel circuit of the present invention at different manufacturing processes.

Referring to FIGS. 2 and 4, in this step, firstly, forming a first wiring layer 200 on the substrate 600 required by the liquid crystal display panel, and then forming a scan line 210 and a gate 110 by patterning methods such as exposure, development, and etching. In this step, the first scan line 210 and the gate 110 are formed along a first direction X, and the gate 110 is electrically connected to the first scan line 210. In an embodiment, this step can further include forming an auxiliary scan line 220 along a second direction Y from the first wiring layer 200. In this embodiment, the second direction Y is perpendicular to the first direction X.

In this step, the gate 110, the first scan line 210, and the auxiliary scan line 220 form the first wiring layer 200 made of copper (Cu) or copper-molybdenum (CuMo) alloy. Thicknesses of the gate 110, the first scan line 210, and the auxiliary scan line 220 range from 2500 angstroms (Å) to 8000 angstroms, and preferably 7000 angstroms.

It should be noted that during a patterning process of the first wiring layer 200, the auxiliary scan line 220 and the first scan line 210 are insulated from each other. That is, the auxiliary scan line 220 and the first scan line 210 are not connected to each other on a same horizontal plane.

After the gate 110, the first scan line 210, and the auxiliary scan line 220 shown in FIG. 4 are formed, in the manufacturing method of the pixel circuit, a gate insulating layer 120 as shown in FIG. 2 is formed on the first wiring layer 200. A purpose of providing the gate insulating layer 120 is not only for isolating the active layer 130, the source 140, and the drain 150 of the thin-film transistor 100 in a subsequent stack, but also for a purpose of planarizing a region of the auxiliary scan line 220.

Figure 5:
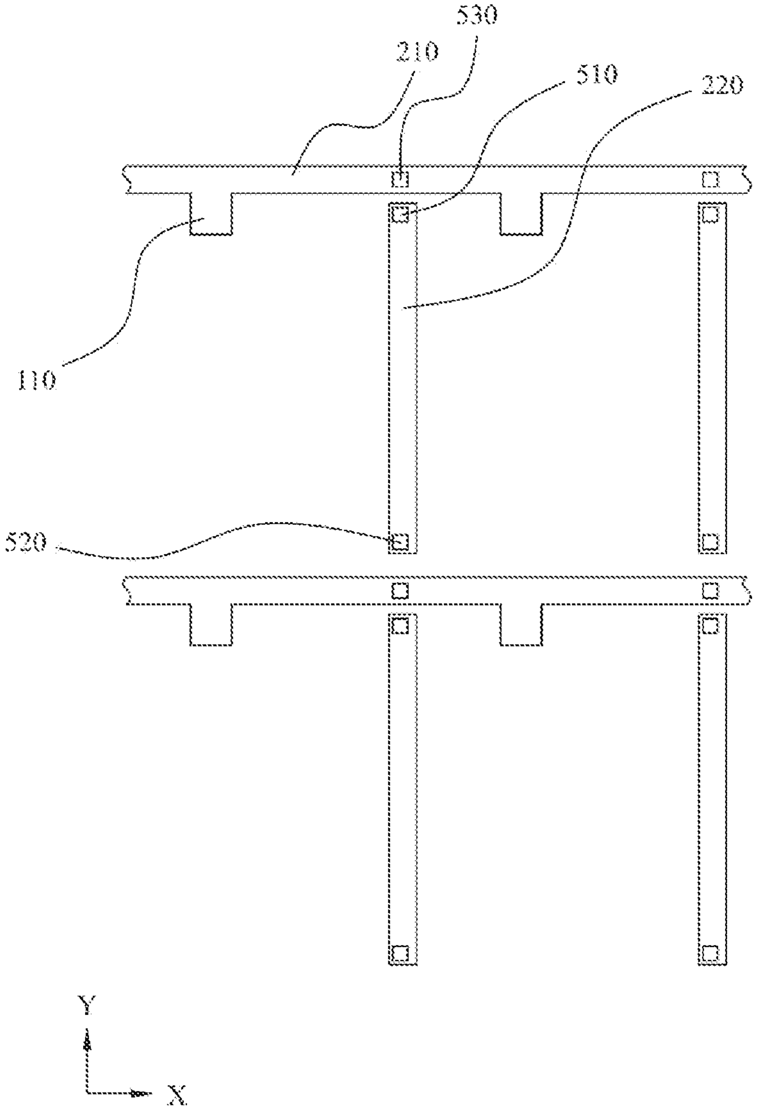

Referring to FIGS. 2 and 5, in this step, in the manufacturing method of the pixel circuit, a first through hole 510 and a second through hole 510 are respectively defined in regions above the gate insulating layer 120 corresponding to two ends of the auxiliary scan line 220, and a third through hole 530 is defined in a region to which the gate insulating layer 120 corresponds above an intersection of axis of the first scan line 210 and the auxiliary scan line 220.

Figure 6:
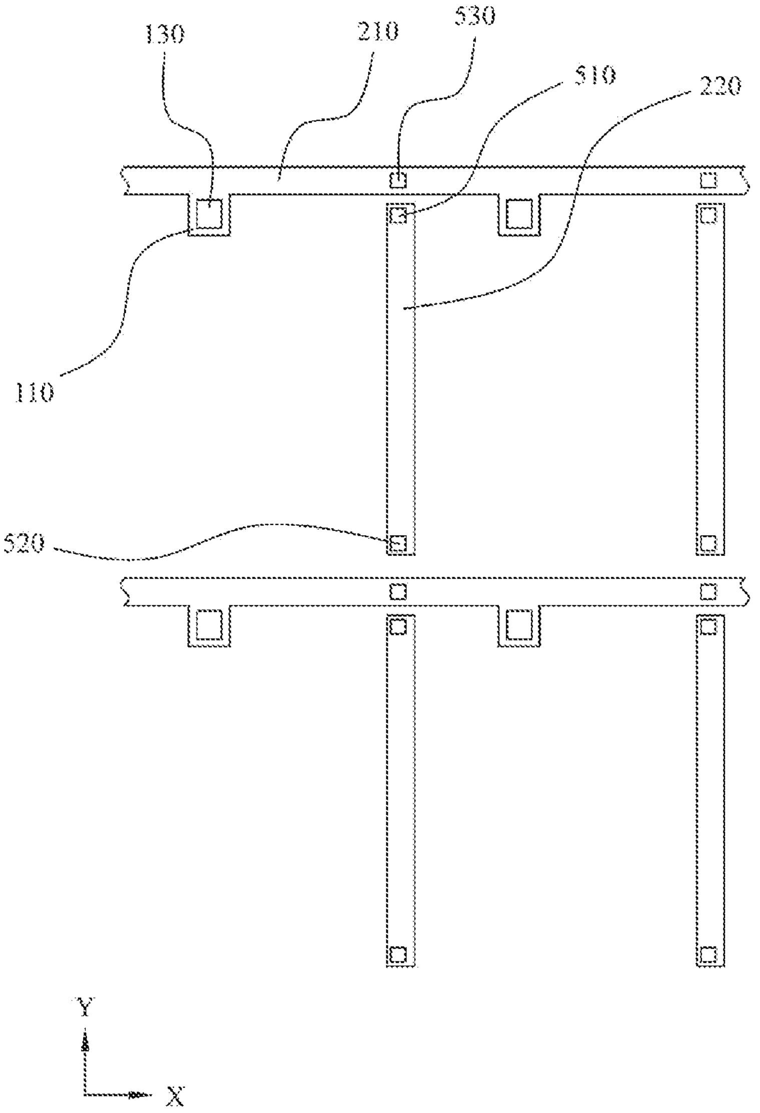

Referring to FIGS. 2 and 6, in this step, in the manufacturing method of the pixel circuit, the active layer 130 is formed on the gate insulating layer 120 corresponding to a region above the gate 110. The active layer 130 is made of indium gallium zinc oxide (IGZO) or amorphous silicon (a-Si) material.

Figure 7:
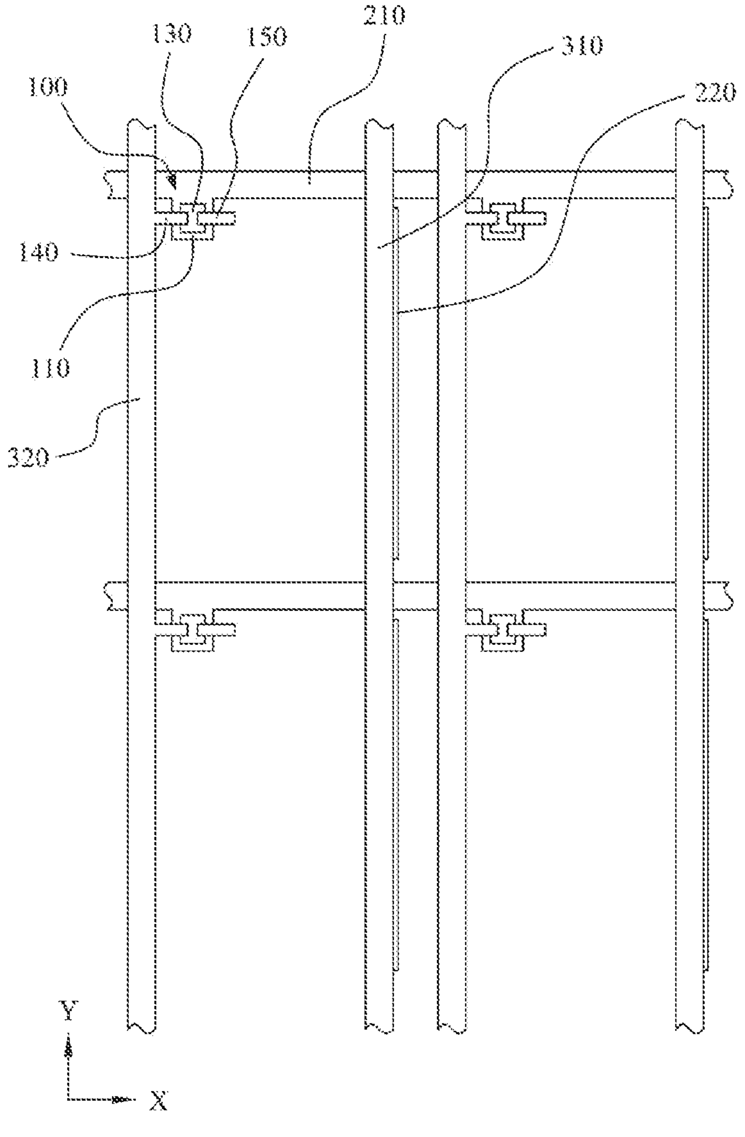

Referring to FIGS. 2 and 7, in this step, in the manufacturing method of the pixel circuit, the source 140 and the drain 150 is formed on two sides of the active layer 130. After the foregoing steps, the pixel circuit has the gate electrode 110, the gate insulating layer 120, the active layer 130, the source 140, and the drain 150 formed. The gate 110, the gate insulating layer 120, the active layer 130, the source 140, and the drain 150 form the basic thin-film transistor 100. The source 140 is configured to receive a data signal of the liquid crystal display panel. The gate 110 is configured to receive a scanning signal of the liquid crystal display panel, and control connecting and disconnecting between the source 140 and the drain 150 through the scanning signal, so as to achieve an image display of the pixel of the liquid crystal display panel.

As shown in FIG. 2 and FIG. 7, this step also includes forming a second wiring layer 300 on the gate insulating layer 120, and forming the second scan line 310 and the data line 320 by patterning methods such as exposure, development, and etching. In this step, the second scan line 310 is formed along the second direction Y, and the second scan line 310 is electrically connected to the first scan line 210 through the third through hole 530 and electrically connected to the auxiliary scan line 220 through the first through hole 510 and the second through hole 520. In addition, in this step, the data line 320 is formed along the second direction Y, and the data line 320 is electrically connected to the source 140.

When the scanning signal of the liquid crystal display panel is being transmitted, it needs to be transmitted by the second scan line 310 and the first scan line 210 to be inputted into the gate 110 of the thin-film transistor 100. Therefore, a wiring path of the scanning signal in the pixel circuit of the present invention is longer than a wiring path of the scanning signal in the pixel circuit of the prior art. Since a longer wiring path of the scanning signal is accompanied by an increased in a wiring resistance, thereby causing a delay of the scanning signal or an insufficient charging of the thin-film transistor 100, which ultimately degrades a display effect of the liquid crystal display panel.

The pixel circuit of the present invention, considering the above-mentioned problems, is provided with the auxiliary scan line 220 connected in parallel with the second scan line 310, so as to increase an equivalent cross-sectional area of the wiring path of the scanning signal, and thereby reducing the wiring resistance. Between the first through hole 510 and the second through hole 520, the equivalent cross-sectional area of the wiring path of the scanning signal is greatly increased, so that the wiring resistance is reduced, the scanning signal is not delayed, and a required charging capacity of the thin-film transistor 100 is maintained, thereby ultimately maintaining the display effect of the liquid crystal display panel.

In this step, the second scan line 310 and the data line 320 form the second wiring layer 300 made of copper (Cu) or copper-molybdenum (CuMo) alloy. Thicknesses of the data line 320 and the second scan line 310 range from 2500 angstroms (Å) to 8000 angstroms, and preferably 7000 angstroms.

It should be noted that during a patterning process of the second wiring layer 300, the data line 320 and the second scan line 310 are insulated from each other. That is, the data line 320 and the second scan line 310 are not connected to each other on a same horizontal plane.

After the data line 320 and the second scan line 310 as shown in FIG. 7 are formed, the second wiring layer 300 of the manufacturing method of the pixel circuit is formed with a passivation layer 700 as shown in FIG. 2. The purpose of providing the passivation layer 700 is not only isolating the thin-film transistor 100, the data line 320, and the second scan line 310, but also for the purpose of planarizing and forming a substrate for a pixel electrode 400 of a subsequent stack.

Figure 8:
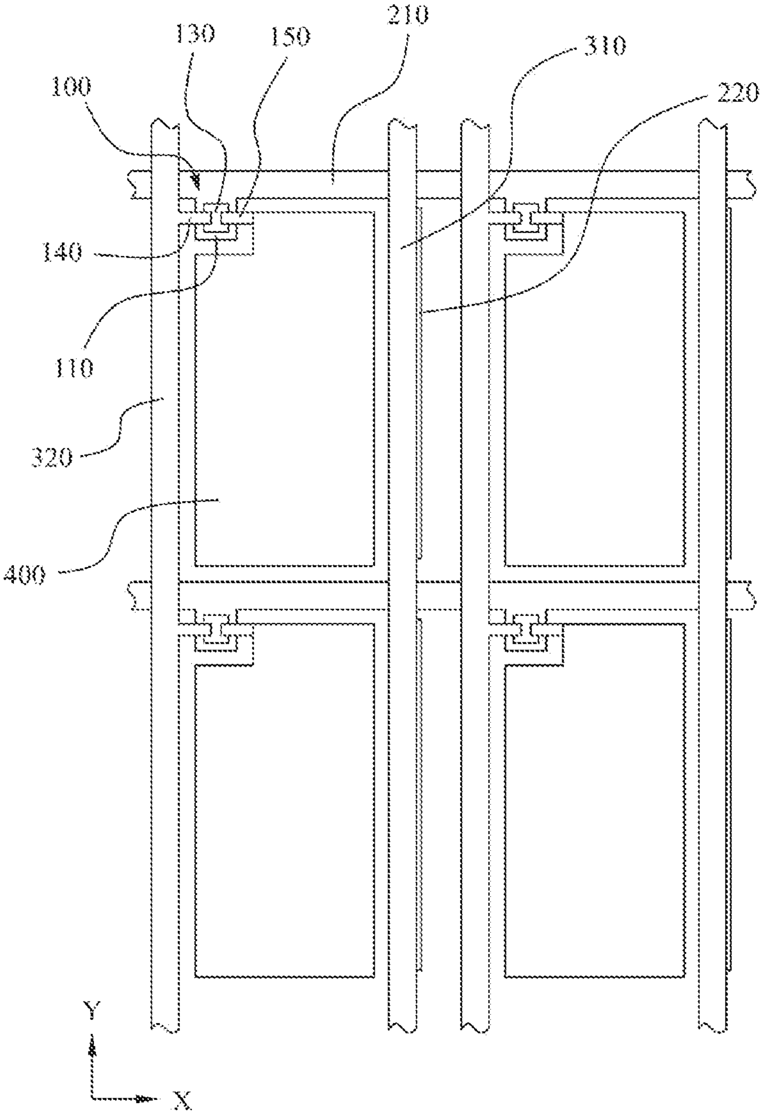

Referring to FIGS. 2 and 8, in this step, in the manufacturing method of the pixel circuit, a fourth through hole 540 is defined in the passivation layer 700 corresponding to a region on the drain 150 of the thin-film transistor 100. This step further includes forming the pixel electrode 400 on the passivation layer 700, and the pixel electrode 400 is electrically connected to the drain 150 through the fourth through hole 540. As shown in FIG. 8, in a top view, the pixel electrode 400 is arranged between the data line 320 and the second scan line 310 along with the auxiliary scan line 220. When the scanning signal of the liquid crystal display panel is inputted to the gate 110 of the thin-film transistor 100 through the second scan line 310 and the first scan line 210, the thin-film transistor 100 is turned on, so that the data signal of the liquid crystal display panel can be inputted to the pixel electrode 400 through the data line 320, the source 140, and the drain 150.

In this embodiment, the data line 320 and the second scan line 310 have a certain distance defined in between. In this way, in addition to effectively performing a circuit wiring configuration of the pixel to maintain an opening ratio of the pixel, the data line 320 and the second scan line 310 can also be prevented from generating a parasitic capacitance, thereby maintaining an operational efficiency that the pixel circuit deserves.

The structural diagrams of the pixel circuit in each of the manufacturing processes shown in FIGS. 4-8 only show the manufacturing method of the pixel circuit of the present invention, and are not intended to limit the pixel circuit of the present invention. In addition, other necessary components of the liquid crystal display panel, configured to achieve a display screen, applying the manufacturing method of the pixel circuit of the present invention are not shown in FIGS. 4-8, people having ordinary skill in the display technology field should be able to understand an arrangement of the other necessary components described in the liquid crystal display panel of the above-mentioned embodiment through the conventional technology in this field.

Referring to FIG. 3, which is a partial circuit diagram of the liquid crystal display panel applying the pixel circuit of the present invention. The partial circuit diagram of the liquid crystal display panel as shown in FIG. 3 includes the pixel circuits of 4 rows and 4 columns. In other words, FIG. 3 shows four of the pixel circuits manufactured by the manufacturing method of the pixel circuit as shown in FIGS. 4-8. In FIG. 3, the first direction X is a horizontal direction of the liquid crystal display panel, and the second direction Y is a vertical direction of the liquid crystal display panel.

Since the first scan line 210 electrically connected to the thin-film transistor 100 is arranged along the first direction X, and the first scan line 210 is further electrically connected to the second scan line 310 arranged along the second direction Y. Therefore, a scan input end S of the scanning signal of the liquid crystal display panel can be configured in a positive direction or a negative direction of the second direction Y. In this embodiment, the scan input end S of the scanning signal can be arranged on an upper side of the liquid crystal display panel.

In addition, since the data line 320 electrically connected to the pixel circuit of the thin-film transistor 100 is arranged along the second direction Y, the data input end D of the data signal of the liquid crystal display panel can be arranged at the positive direction or the negative direction of the second direction Y. In this embodiment, the data input end D of the data signal can be arranged on the upper side of the liquid crystal display panel. That is, the scan input end S of the scanning signal and the data input end D of the data signal is arranged on a same side.

As shown in FIG. 3, although the wiring path from the scan input end S of the scanning signal to the thin-film transistor 100 of each of the pixel circuits is longer than the wiring path of that in the prior art, in the present invention, the second scan line 310 is connected in parallel with the auxiliary scan line 220 to increase the equivalent cross-sectional area of the wiring path of the scanning signal, thereby reducing the wiring resistance.

It can be seen from the example of FIG. 3 that facilitated from a structural design of the pixel circuit of the present invention, the scan input end S of the scanning signal of the liquid crystal display panel and the data input end D of the data signal can be arranged on a same side of the liquid crystal display panel. Therefore, three sides of the frame of the liquid crystal display panel do not need to be configured to be any input ends to be provided with driver chips or configured to be binding ends, etc., thereby effectively saving the wiring space of the liquid crystal display panel, and reducing the space of the frame, such that the screen ratio of the liquid crystal display panel can be increased.

The inventor completed the pixel circuit of the present invention with creative labor. The following provides an auxiliary explanation of experimental data of the present invention, and compares the liquid crystal display panel applying the present invention with the liquid crystal display panel of the prior art.

Referring to Table 1 below, which compares widths of four sides of the liquid crystal display panel of the prior art and widths of four sides of the liquid crystal display panel applying the pixel circuit of the present invention.

It should be noted that in Table 1, the position of an upper frame of the liquid crystal display panel of the prior art and the position of an upper frame of the liquid crystal display panel applying the pixel circuit of the present invention all arranged with an input end of the scanning signal and an input end of the data signal.

TABLE 1

| | Liquid crystal display panel of the prior art | Liquid crystal display panel applying pixel circuit of the present invention |
|---|---|---|
| upper frame width (mm) | >6 mm | >2 mm |
| bottom frame width (mm) | >5 mm | >1 mm |
| left frame width (mm) | >5 mm | >1 mm |
| right frame width (mm) | >5 mm | >1 mm |

In the prior art, the data line and the scan line that are perpendicularly interlaced and input that drive the liquid crystal display panel cause two adjacent sides of the liquid crystal display panel to have a wider frame. The pixel circuit and the manufacturing method thereof of the present invention arrange the signal input end S of the scanning signal and the data input end D data signal of the thin-film transistor 100 on the same side of the liquid crystal display panel through a design of the first scan line 210 arranged along the first direction X and the second scan line 310 arranged along the second direction Y. Therefore, it can be seen from Table 1 that the liquid crystal display panel applying the present invention can effectively reduce the wiring space of the liquid crystal display panel, and reduce a space of the frame of the liquid crystal display panel of the prior art, so that the screen ratio of the liquid crystal display panel applying the pixel circuit of the present invention is higher than a screen ratio of the liquid crystal display panel in the prior art.

Referring to Table 2 below, which compares resistance and capacitance of a scan line (indicated by a column named as first scan line) of the liquid crystal display panel of the prior art, the resistance and the capacitance of the first scan line 210 and the second scan line 310 of the liquid crystal display panel applying the pixel circuit of the present invention without the auxiliary scan line 220, and the resistance and the capacitance of the first scan line 210 and the second scan line 310 of the liquid crystal display panel applying the pixel circuit of the present invention with the auxiliary scan line 220.

TABLE 2

| | | Liquid crystal display panel of the prior art | Liquid crystal display panel applying pixel circuit without auxiliary scan line of the present invention | Liquid crystal display panel applying pixel circuit with auxiliary scan line of the present invention |
|---|---|---|---|---|
| first scan line | resistance (Ω) | 0.205 | 0.198 | 0.28 |
| | capacitance (pF) | 0.056 | 0.054 | 0.04 |
| second scan line | resistance (Ω) | N/A | 1.189 | 0.355 |
| | capacitance (pF) | N/A | 0.042 | 0.043 |

As shown in Table 2, when the pixel circuit and the manufacturing method of the present invention are provided with the second scan line 310, additional resistance is added compared to the conventional technology. Therefore, the present invention further provides the auxiliary scan line 220 connected in parallel with the second scan line 310, which significantly reduces the resistance of the first scan line 210 and the second scan line 310.

Therefore, the pixel circuit and the manufacturing method thereof of the present invention can not only increase the screen ratio of the liquid crystal display panel applying the pixel circuit of the present invention compared to the screen ratio of the liquid crystal display panel of the prior art, but also maintain an expected performance of the liquid crystal display panel.

The description above are only preferred embodiments of the invention. It should be pointed out that to those of ordinary skill in the art, various improvements and embellishments may be made without departing from the principle of the present invention, and these improvements and embellishments are also deemed to be within the scope of protection of the present invention.

What is claimed is:

1. A pixel circuit, comprising:

a thin-film transistor;

a first scan line arranged along a first direction, wherein the first scan line is electrically connected to the thin-film transistor;

a second scan line arranged along a second direction, wherein the second scan line is electrically connected to the first scan line, and the second direction is perpendicular to the first direction;

an auxiliary scan line arranged along the second direction, wherein two ends of the auxiliary scan line are electrically connected to the second scan line; and a data line arranged along the second direction, wherein the data line is electrically connected to the thin-film transistor; and wherein the auxiliary scan line and the first scan line are arranged in a first wiring layer, and the auxiliary scan line and the first scan line are insulated from each other in the first wiring layer.

2. The pixel circuit according to claim 1, wherein the auxiliary scan line and the second scan line are arranged in different layers.

3. The pixel circuit according to claim 1, wherein the data line and the second scan line are arranged in a second wiring layer, and the data line and the second scan line are insulated from each other in the second wiring layer.

4. The pixel circuit according to claim 1, wherein a thickness of the auxiliary scan line ranges from 2500 angstroms to 8000 angstroms.

5. The pixel circuit according to claim 4, wherein the thickness of the auxiliary scan line is 7000 angstroms.

6. The pixel circuit according to claim 1, further comprising:

a pixel electrode arranged between the data line and the second scan line along with the auxiliary scan line, wherein the pixel electrode is electrically connected to the thin-film transistor.

7. The pixel circuit according to claim 1, further comprising:

a scan input end electrically connected to an end of the second scan line away from the first scan line, and inputting a scanning signal to the thin-film transistor through the first scan line, the second scan line, and the auxiliary scan line; and a data input end electrically connected to an end of the data line away from the thin-film transistor, and inputting a data signal to the thin-film transistor through the data line.

8. The pixel circuit according to claim 7, wherein the scan input end and the data input end are arranged along a positive direction or a negative direction of the second direction.

9. A manufacturing method of a display panel comprising:

forming a first wiring layer, wherein the first wiring layer comprises a first scan line and a gate along a first direction and an auxiliary scan line along a second direction, the auxiliary scan line and the first scan line are insulated from each other in the first wiring layer, and the gate is electrically connected to the first scan line;

forming a gate insulating layer on the gate;

forming an active layer on the gate insulating layer;

forming a source and a drain on the active layer, wherein the source and the drain is electrically connected to the active layer;

forming a second scan line along the second direction, wherein the second direction is perpendicular to the first direction, the second scan line is electrically connected to the first scan line, and two ends of the auxiliary scan line are electrically connected to the second scan line; and forming a data line along the second direction, wherein the data line is electrically connected to the source.

10. The manufacturing method according to claim 9, wherein the auxiliary scan line and the second scan line are formed in different layers.

11. The manufacturing method according to claim 9, wherein the data line and the second scan line are formed by a second wiring layer, and the data line and the second scan line are insulated from each other in the second wiring layer.

12. The manufacturing method according to claim 9, wherein a thickness of the auxiliary scan line ranges from 2500 angstroms to 8000 angstroms.

13. The manufacturing method according to claim 12, wherein the thickness of the auxiliary scan line is 7000 angstroms.

14. The manufacturing method according to claim 9, further comprising:

forming a pixel electrode between the data line and the second scan line along with the auxiliary scan line, wherein the pixel electrode is electrically connected to the thin-film transistor.

15. The manufacturing method according to claim 9, further comprising:

forming a scan input end on an end of the second scan line away from the first scan line, wherein the scan input end inputs a scanning signal to the thin-film transistor through the first scan line, the second scan line, and the auxiliary scan line; and forming a data input end on an end of the data line away from the thin-film transistor, wherein the data input end inputs a data signal to the thin-film transistor through the data line.

16. The manufacturing method according to claim 15, wherein the scan input end and the data input end are formed along a positive direction or a negative direction of the second direction.

* * * * *